United States Patent [19]
Beach

[11] 3,732,794
[45] May 15, 1973

[54] CAMERA BODY RELEASE LEVER MECHANISM

[75] Inventor: David E. Beach, Rochester, N.Y.

[73] Assignee: Eastman Kodak Company, Rochester, N.Y.

[22] Filed: Mar. 16, 1972

[21] Appl. No.: 235,142

[52] U.S. Cl. ............... 95/11 L, 95/11 V, 95/11.5 R
[51] Int. Cl. .................. G03b 15/04, G03b 17/20
[58] Field of Search ............. 95/11 R, 11 V, 11 L, 95/11.5 R; 240/1.3; 431/92, 93

[56] References Cited

UNITED STATES PATENTS 3,661,063 5/1972 Beach ........................ 95/11.5 R
3,630,129 12/1971 Gow et al ..................... 95/11.5 R

*Primary Examiner*—Robert P. Greiner
*Attorney*—W. H. J. Kline et al.

[57] ABSTRACT

A camera includes an exposure mechanism and a member movable to sense the existence or non-existence of a predetermined camera condition. A shutter release button is movable to operate the exposure mechanism. The shutter release button is interconnected with the sensing member by a rocker member which amplifies the shutter release button's movement to minimize the travel of the button necessary to operate the sensing member. Means are provided for adjusting the sequence of operation of the exposure mechanism and the sensing member.

6 Claims, 3 Drawing Figures

/* 3,732,794 */

CAMERA BODY RELEASE LEVER MECHANISM

CROSS-REFERENCE TO RELATED APPLICATIONS

Reference is made to coassigned, copending U.S. applications Ser. No. 23,127, entitled "Mechanism for Sensing the Condition of a Percussive Flash Device and For Effecting Synchronous Percussive Flash Exposures," filed Mar. 27, 1970 in my name and Ser. No. 203,733, entitled "Camera," filed Dec. 1, 1971 in the names of David E. Beach and Jeffrey R. Stoneham.

BACKGROUND OF THE INVENTION

1. Field of the Invention

The present invention relates to shutter release mechanisms and cameras, and more particularly to an improved shutter release button and associated devices for such cameras.

2. Description of the Prior Art

Recently an improved flash device has been developed which includes a plurality of percussively ignitable flash lamps contained in a multilamp unit, or flash cube, provided with a striker member or wire for each flash lamp. The striker wire is maintained in an energized position, spaced from its respective flash lamp, and is dislodgably releasable to rapidly impact and fire the lamp.

My aforementioned U.S. application Ser. No. 23,127 discloses a camera mechanism for sensing whether the striker wire of the percussive lamp positioned at the camera flash station is energized, and then releasing the striker wire from an energized condition in synchronization with actuation of the camera shutter. In that application, the camera mechanism for sensing and indicating the condition of a striker is operable in response to the actuation of the body release.

SUMMARY OF THE INVENTION

The present invention is an improvement upon the mechanism described in my U.S. application Ser. No. 23,127 wherein the amount of travel of the shutter release button to effect camera operation is minimized and wherein the timed sequence of operation of various camera functions responsive to movement of the shutter release button can be adjusted.

To minimize travel of the shutter release lever, a preferred embodiment of the present invention includes a rocker member associated with the shutter release lever to amplify movement of the release lever for effecting camera functions. The timed sequence of shutter release and other camera functions can be adjusted in the preferred embodiment by changing the position of the shutter release lever relative to the rocker member and to the shutter trip mechanism.

The invention, and its objects and advantages, will become more apparent in the detailed description of the preferred embodiment presented below.

DESCRIPTION OF THE DRAWING

In the detailed description of the preferred embodiment of the invention presented below, reference is made to the accompanying drawing, in which.

DESCRIPTION OF THE PREFERRED EMBODIMENT

Figure 1:
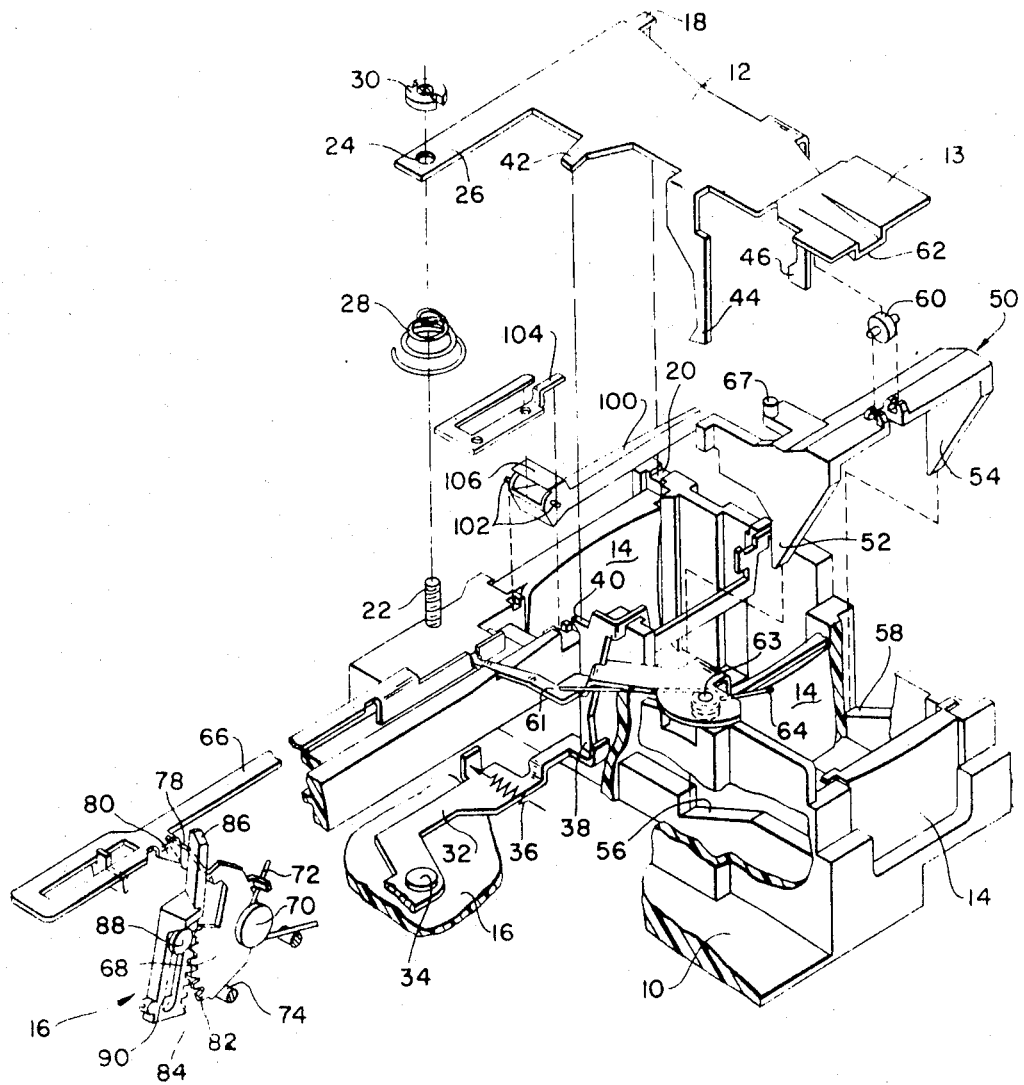
FIG. 1 is an exploded perspective view, partially broken away of a portion of a camera in accordance with the present invention.

Because cameras are well known, the present description is directed in particular to elements forming part of, or cooperating more directly with, apparatus in accordance with the present invention. It is to be understood that camera elements not specifically shown or described may take various forms well known to those skilled in the art.

Referring to the drawings, the illustrated camera includes a housing (a portion of which is shown and designated by reference numeral 10) which supports a body release lever 12 with integral button 13, optical elements 14 within a viewfinder cavity, and a percussion flash cube firing mechanism generally designated at 16. The camera illustrated as the preferred embodiment of the present invention is adapted to receive in a socket, a percussively ignitable flash cube, not shown which is fireable synchronously with the operation of the camera shutter by mechanisms described in aforementioned application Ser. No. 23,127.

Percussively fireable flash cubes are generally known in the art and comprise a base for supporting a plurality of percussively ignitable flash lamps, and impacting members or striker wires associated with each flash lamp, and supporting or indexing means. Since such flash lamps are well known in the art, they will not be described in detail here. In order to fire one of the lamps, an actuating member is inserted through an opening in the base and into the cube to dislodge the striker wire from its energized position. The striker wire then rapidly strikes the base of the flash lamp to ignite percussively the primer, which, in turn, deflagrates into the envelope, to ignite the combustible material and fire the lamp. In the energized position, the striker wire is located over an opening in the cube base. After igniting the lamp, the striker wire remains in contact with the lamp base and is not over the opening in the base of the cube.

Although there are several known ways for effecting synchronous flash exposures, I have shown in the drawings a mechanism adapted to perform a variety of functions in various situations. The absence of an energized striker at the camera firing site is indicated by a visual warning signal in the viewfinder. The mechanism is provided with means for dislodging an energized striker wire to ignite a flash lamp.

Body release lever 12 is pivotally mounted on camera housing 10 by a tab 18 which rests in a slot 20 in the housing and by a threaded stud 22 which extends through a hole 24 in a second tab 26 of the body release lever. A coil spring 28 urges tab 26 upwardly against a nut 30 which may be adjusted during camera manufacture to selectively raise and lower the pivot point of body release lever 12 for purposes to be explained hereinafter.

The camera may include one of many known exposure mechanisms operable to expose a frame of film therein. For instance, it may take the form of that disclosed in aforementioned U.S. application Ser. No. 203,733, the disclosure of which is hereby specifically incorporated herein by reference. In the present drawings, a shutter release lever 32 is shown mounted on housing 10 by a stud 34 for rotation in a clockwise direction, as therein viewed, against the force of a spring 36 to trip the shutter. A rocker linkage 38 is pivotally mounted on housing 10 above the viewfinder cavity and includes a tab 40 which cooperates with another tab 42 on body release lever 12 when the lever is depressed to so rotate shutter release lever 32 to trip the shutter.

Figure 2:
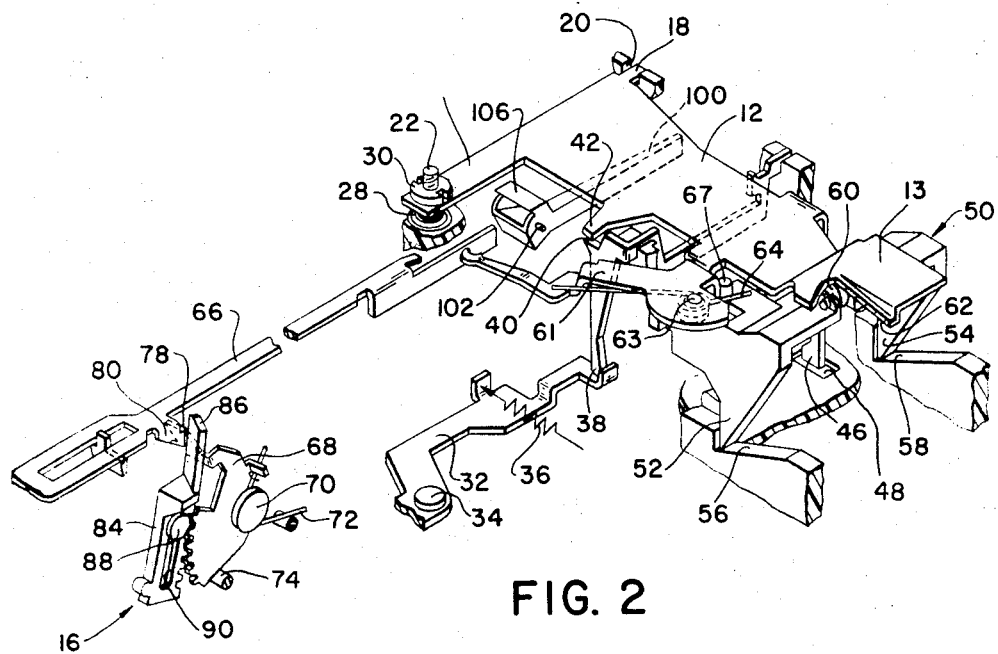
FIG. 2 is an assembled view of the camera elements shown in FIG. 1.

A pair of legs 44 and 46 depend from body release lever 12 and are aligned with corresponding openings in housing 10, one such opening 48 being shown in FIG. 2. Suitable mechanism may be provided below the openings to prevent depression of body release lever 12 when desired, such as for example to prevent accidental double exposure and/or to prevent tripping the shutter while the film is being advanced to the next frame.

Figure 3:
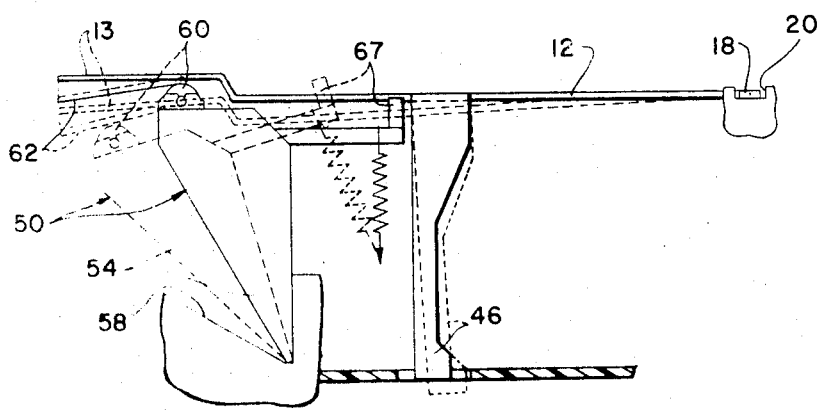
FIG. 3 is a side elevational view of a portion of the camera elements shown in FIG. 1.

A rocker member 50 having a pair of depending pivot legs 52 and 54 is mounted between body release lever 12 and the viewfinder cavity and pivots about the ends of legs 52 and 54 in notches 56 and 58 in camera housing 10. A roller 60 is carried on rocker member 50 and contacts a ramp-shaped cam surface 62 on body release lever 12 (best seen in FIG. 3). The cam surface is shaped so that depression of the body release lever results in a smooth and accelerated rotation of rocker member 50 about the ends of its legs.

To conserve space in the camera housing, I have positioned body release lever 12 and rocker member 50 above and straddling the viewfinder cavity. Additional conservation of space is accomplished by tripping the shutter mechanism after only limited travel of the body release lever. However, since this travel is used to operate camera elements requiring a large amount of travel, as will be discussed hereinafter, the movement of the body release lever must be amplified, and this is partially accomplished by the cam configuration of roller 60 and ramp 62 and by the relative lengths of shutter release lever 12 and rocker member 50, i.e. slight movement of body release lever 12 results in amplified angular movement of rocker member 50.

A lever 61 is pivotally mounted on camera housing 10 by a stud 63 so that angular displacement of rocker member 50 is transmitted thereto by a lost motion spring 64. A slide 66, which effects the flash sensing functions, is coupled to lever 61 for movement therewith. A spring, shown in FIG. 3, urges rocker member 50 in a clockwise direction as viewed in FIG. 3.

A coupling 68 is pivotally mounted on a post 70 and biased in a counterclockwise direction as viewed in FIG. 1 by a torsion spring 72. Counterclockwise rotation of coupling 68 is limited by a lug 74 extending from the camera housing. A tab 78 on coupling 68 is in abutting engagement with a tab 80 on slide 66 to limit movement of the slide by the position of coupling 68. A sector gear 82 on coupling 68 is provided for driving a second sector gear 84 on a striker sensing probe 86.

Probe 86 normally lies flush with, or below, the outer surface of the camera housing, and can be extended through an opening in the housing. The probe is guided by a pin 88 extending through a slot 90 and by the surfaces defining the opening in the camera housing. Probe 86 is displaced upwardly until it abuts against the striking legs of a flash cube, or until pin 88 engages the lower end of slot 90.

A flag 100 is mounted for pivotal movement about a pair of pins 102 and is biased toward a raised position out of the field of view of the viewfinder by a leaf spring 104. Flag 100 is provided with an abutment 106 which is engageable by slide 66 and displaceable thereby to a position across the viewfinder.

The sensing function of the mechanism can now be explained. Assuming a flash cube has been inserted in the camera socket, the depression of body release lever 12 causes rocker member 50 to rotate from its full line to its phantom line position (FIG. 3) causing displacement of slide 66 by spring 63 and lever 61. As slide 66 moves, tab 80 thereon engages tab 78 of coupling 68 and rotates the latter in a closewise direction, whereby sector gear 82 moves probe 86 upwardly. If there is a flash cube striker leg, not shown in its path, probe 86 is halted and additional movement of body release lever 12 is taken up in lost motion spring 64. If, there is no striker leg in its path, probe 86 is moved to its extreme upward position and slide 66 engages flag abutment 106 to move flag 100 across the viewfinder. The latter occurrence warns the photographer that he cannot make a flash exposure with the flash cube in its present orientation in the camera, and he may then release shutter release lever 12 to refrain from making the exposure. Of course, at the photographer's option, lever 12 may be continued to be depressed to make an exposure without flash.

Means can also be provided as disclosed in my copending U.S. Patent application Ser. No. 23,127 for preventing slide 66 from moving to lower the signal into the viewfinder if a flash lamp is not mounted on the camera.

Since shutter release lever 12 operates both the exposure mechanism and also viewfinder signal 100 upon movement of the shutter release lever toward the viewfinder cavity, adjustment of the mechanism is critical so that the photographer is warned of a bad bulb in sufficient time to cancel operation of the exposure mechanism. In other words, depression of lever 12 must pivot rocker member 50 sufficiently to cause signal 100 to appear in the viewfinder before tab 42 moves lever 38 sufficiently to unlatch the high energy lever of the shutter mechanism, not shown. In accordance with one novel feature of the present invention, the axis about which lever 12 pivots may be moved by adjusting nut 30. Moving the axis upwardly away from the viewfinder cavity by turning the nut in a counter-clockwise direction results in greater movement of rocker 50 before shutter operation, while moving the axis downwardly toward the viewfinder has the opposite effect. This adjustment may be made in the factory during camera assembly.

The invention has been described in detail with particular reference to preferred embodiments thereof, but it will be understood that variations and modifications can be effected within the spirit and scope of the invention.

I claim:

1. In a camera having a housing, and exposure mechanism in said housing operable to expose a frame of film, and a shutter release lever mounted on said housing for pivotal movement about a first axis from a first position to a second position for operating said exposure mechanism, the improvement comprising:

a generally U-shaped rocker member having a pair of generally parallel legs and a portion interconnecting one end of each of said legs, said rocker member being angularly movable from a rest position about a second axis parallel to and spaced from said first axis and intercepting said legs at points spaced from said portion to effect a camera function; and means associated with said shutter release lever and said rocker member for rotating said rocker member from its rest position upon movement of said shutter release lever from its first position toward its second position.

2. The improvement as defined in claim 1 further comprising:

a sensing member movable a predetermined distance against a spring bias to sense the existence or nonexistence of a predetermined camera condition and movable beyond said predetermined distance if said condition does not exist; and lost motion spring means interconnecting said rocker member and said sensing member for moving said sensing member against its spring bias when said rocker member moves away from its rest position.

3. The improvement as defined in claim 1 further comprising means defining a viewfinder cavity extending between the legs of said rocker member.

4. In a camera having (1) a housing, (2) an exposure mechanism in said housing operable to expose a frame of film, (3) a member mounted in said housing for movement to effect a camera function other than operation of said exposure mechanism, (4) a shutter release lever movably mounted on said housing, (5) first means interconnecting said shutter release lever and said exposure mechanism for operating said exposure mechanism upon movement of said shutter release lever, and (6) second means interconnecting said shutter release lever and said member for effecting said camera function upon movement of said shutter release lever; the improvement comprising means for adjusting the amount of travel of said shutter release lever required to operate said exposure mechanism relative to the amount of travel of said shutter release lever required to effect said camera function, whereby the sequence of operation of said camera function and said exposure mechanism can be adjusted.

5. The improvement as defined in claim 4 wherein said camera function includes the actuation of a warning signal to alert the user of the occurrence a predetermined exposure characteristic.

6. The improvement as defined in claim 4 wherein
said shutter release lever is pivotally mounted on said housing;

said first and second interconnecting means are spaced apart in a direction along said shutter release lever from the pivotal mounting of said shutter release lever; and said adjusting means includes means for moving the pivotal mounting of said shutter release lever in a direction generally perpendicular to the direction of spacing between said first and second interconnecting means.

* * * * *